United States Patent
Ma et al.

(10) Patent No.: US 7,396,798 B2
(45) Date of Patent: Jul. 8, 2008

(54) METHOD FOR PREPARING CATALYST SUPPORTS AND SUPPORTED CATALYSTS FROM SINGLE WALLED CARBON NANOTUBES

(75) Inventors: Jun Ma, Lexington, MA (US); David Moy, Winchester, MA (US); Howard Tennent, Kennett Square, PA (US); Robert Hoch, Hensonville, NY (US); Alan Fischer, Cambridge, MA (US)

(73) Assignee: Hyperion Catalysis International, Inc., Cambridge, MA (US)

( * ) Notice: Subject to any disclaimer, the term of this patent is extended or adjusted under 35 U.S.C. 154(b) by 0 days.

(21) Appl. No.: 11/281,575

(22) Filed: Nov. 16, 2005

(65) Prior Publication Data

US 2006/0137817 A1 Jun. 29, 2006

Related U.S. Application Data

(60) Provisional application No. 60/628,678, filed on Nov. 17, 2004.

(51) Int. Cl.
| | |
|---|---|
| *B01J 21/18* | (2006.01) |
| *B01J 23/40* | (2006.01) |
| *B01J 23/74* | (2006.01) |
| *B32B 5/24* | (2006.01) |
| *B32B 5/16* | (2006.01) |
| *B32B 9/00* | (2006.01) |
| *D21H 11/00* | (2006.01) |
| *D02G 3/00* | (2006.01) |
| *D01F 9/12* | (2006.01) |

(52) U.S. Cl. ............... 502/185; 428/311.11; 428/312.2; 428/323; 428/367; 428/378; 428/408; 423/447.2

(58) Field of Classification Search ................. 502/185; 428/408, 312.2, 311.11, 323, 367, 378; 423/447.2, 423/450, 447.4

See application file for complete search history.

(56) References Cited

U.S. PATENT DOCUMENTS

| | | | |
|---|---|---|---|
| 4,997,804 | A | 3/1991 | Pekala |
| 5,081,163 | A | 1/1992 | Pekala |
| 5,086,085 | A | 2/1992 | Pekala |
| 5,124,100 | A | 6/1992 | Nishii et al. |
| 5,165,909 | A | 11/1992 | Tennent et al. |
| 5,275,796 | A | 1/1994 | Tillotson et al. |
| 5,395,805 | A | 3/1995 | Droege et al. |
| 5,409,683 | A | 4/1995 | Tillotson et al. |

(Continued)

OTHER PUBLICATIONS

Georgakilas, et al., "Organic Functionalization of Carbon Nanotubes," J.Am.Chem. Soc. (2002); 124; 760-761.

(Continued)

*Primary Examiner*—J. A. Lorengo
*Assistant Examiner*—Patricia L Hailey
(74) *Attorney, Agent, or Firm*—Kramer Levin Naftalis & Frankel LLP; Barry Evans, Esq.

(57) ABSTRACT

A new method for preparing a supported catalyst is herein provided. A carbon nanotube structure such as a rigid porous structure is formed from single walled carbon nanotubes. A metal catalyst is then loaded or deposited onto the carbon nanotube structure. The loaded carbon nanotube is preferably ground to powder form.

4 Claims, 1 Drawing Sheet

U.S. PATENT DOCUMENTS

| | | | |
|---|---|---|---|
| 5,416,376 | A | 5/1995 | Wuest et al. |
| 5,424,054 | A | 6/1995 | Bethume et al. |
| 5,456,897 | A | 10/1995 | Moy et al. |
| 5,476,878 | A | 12/1995 | Pekala |
| 5,494,940 | A | 2/1996 | Unger et al. |
| 5,500,200 | A | 3/1996 | Mandeville et al. |
| 5,569,635 | A | 10/1996 | Moy et al. |
| 5,691,054 | A | 11/1997 | Tennent et al. |
| 5,707,916 | A | 1/1998 | Snyder et al. |
| 5,965,470 | A | 10/1999 | Bening et al. |
| 6,099,965 | A * | 8/2000 | Tennent et al. .............. 428/408 |
| 6,143,689 | A | 11/2000 | Moy et al. |
| 6,203,814 | B1 | 3/2001 | Fisher et al. |
| 6,221,330 | B1 | 4/2001 | Moy et al. |
| 6,333,016 | B1 | 12/2001 | Resasco et al. |
| 6,432,866 | B1 * | 8/2002 | Tennent et al. .............. 502/180 |
| 6,749,712 | B2 * | 6/2004 | Kuper ........................ 156/296 |
| 6,761,870 | B1 | 7/2004 | Smalley et al. |
| 6,790,425 | B1 * | 9/2004 | Smalley et al. ........... 423/447.1 |
| 6,921,575 | B2 * | 7/2005 | Horiuchi et al. ............. 428/367 |
| 2005/0214539 | A1 * | 9/2005 | Ying et al. .................. 428/408 |

OTHER PUBLICATIONS

Holzinger, et al., Functionalization of Single-Walled Carbon Nanotubes with (R-)Oxycarbonyl I Nitrenes, J.Am.Chem.Soc. (2003); 125; 8566-8580.

Kuzmany, et al., "Exohedral and Endohedral Funcionalization of Single Wall Carbon Nanotubes," Synthetic Methals, (2003); 135-136; 791-793.

Holzinger, et al., "[2+1] Cycloaddition for Cross-Linking SWCNTs," Carbon (2004); 42; 941-947.

U.S. Appl. No. 60/628,498, filed Nov. 16, 2004.

U.S. Appl. No. 08/812,856, filed Mar. 6, 1997.

U.S. Appl. No. 08/812,856, filed Mar. 16, 1997.

* cited by examiner

METHOD FOR PREPARING CATALYST SUPPORTS AND SUPPORTED CATALYSTS FROM SINGLE WALLED CARBON NANOTUBES

CROSS REFERENCE INFORMATION

This application claims benefit to and priority of U.S. Provisional Application No. 60/628,678, filed Nov. 17, 2004, which is hereby incorporated by reference in its entirety.

FIELD OF THE INVENTION

The invention relates generally to method for preparing rigid porous carbon structures from single walled carbon nanotubes. More specifically, the invention relates to rigid three dimensional structures comprising carbon nanotubes and having high surface area and porosity, low bulk density, low amount of micropores and high crush strength and to methods of preparing and using such structures. The invention also relates to using such rigid porous structures for a variety of purposes including catalyst supports, electrodes, filters, insulators, adsorbents and chromatographic media and to composite structures comprising the rigid porous structures and a second material contained within the carbon structures.

BACKGROUND OF THE INVENTION

Catlyst Supports and Supported Catalysts

Supported catalysts (i.e., catalysts which are supported on some sort of surface, structure, or support, etc.) typically comprise an inert support material and a catalytically active material. Because heterogeneous reactions are normally carried out at elevated temperatures (and sometimes at elevated pressures as well) and in a reactive atmosphere, the exact chemical nature of the active catalyst component within the reaction zone can be difficult to determine. Thus, the terms "catalyst" or "supported catalyst" are often used interchangeably in the industry to refer to the composition comprising both the inert support and catalytically active material that is charged into the reaction zone, although it is acknowledged that the exact nature of the active material within the reaction zone is usually not determinable.

Supported catalysts may be prepared by, for example, initially depositing precursors of the actual catalytically active material onto the inert support and then treating them accordingly (e.g., calcination), before feeding them into the reaction zone. More extensive pre-treatments and passivation steps to stabilize the supported catalyst before feeding to the reaction zone are also common. In a common example, metal salts are deposited onto inert support, converted into metal oxides by calcinations at elevated temperatures and then further reduced in situ to active pure metal catalysts.

Heterogeneous catalytic reactions are widely used in chemical processes in the petroleum, petrochemical and chemical industries. Such reactions are commonly performed with the reactant(s) and product(s) in the fluid phase and the catalyst in the solid phase. In heterogeneous catalytic reactions, the reaction occurs at the interface between phases, i.e., the interface between the fluid phase of the reactant(s) and product(s) and the solid phase of the supported catalyst. Hence, the properties of the surface of a heterogeneous supported catalyst are significant factors in the effective use of that catalyst. Specifically, the surface area of the active catalyst, as supported, and the accessibility of that surface area to reactant chemisorption and product desorption are important. These factors affect the activity of the catalyst, i.e., the rate of conversion of reactants to products.

Generally catalytic activity is proportional to catalyst surface area. Therefore, high specific area is desirable. However, that surface area must be accessible to reactants and products as well as to heat flow.

The active catalyst material may be supported on the external and/or internal structure of a support. Often, the internal structure of a support can contain a greater surface area than the external surface, because of the internal porosity. The chemisorption of a reactant by a catalyst surface is preceded by the diffusion of that reactant through the internal structure of the support. The active catalyst compounds are also often located or supported inside the internal structure of a support, the accessibility of the internal structure of a support material to reactant(s), product(s) and heat flow is important. Porosity and pore size distribution of the support structure are measures of that accessibility. Activated carbons and charcoals used as catalyst supports have surface areas of about 1000 square meters per gram and porosities of greater than one milliliter per gram. However, much of this surface area and porosity, as much as 50%, and often more, is often associated with micropores, i.e., pores with pore diameters of 2 nanometers or less. These pores can be difficult to access because of diffusion limitations. Moreover, they are easily plugged and thereby deactivated. Thus, high porosity materials where the pores are mainly in the mesopore (>2 nanometers) or macropore (>50 nanometers) are most desirable.

It is also important that supported catalysts not fracture or attrit during use because such fragments may become entrained in the reaction stream and must then be separated from the reaction mixture. The cost of replacing attritted catalyst, the cost of separating it from the reaction mixture and the risk of contaminating the product are all burdens upon the process. In other processes, e.g. where the solid supported catalyst is filtered from the process stream and recycled to the reaction zone, the fines may plug the filters and disrupt the process.

The chemical purity of the catalyst and the catalyst support also have important effects on the selectivity of the catalyst, i.e., the degree to which the catalyst produces one product from among several products, and the life of the catalyst. Thus, it is also important that a catalyst, at the very least, minimize its contribution to the chemical contamination of reactant(s) and product(s). In the case of a catalyst support, this is even more important since the support is a potential source of contamination both to the catalyst it supports and to the chemical process. Further, some catalysts are particularly sensitive to contamination that can either promote unwanted competing reactions, i.e., affect its selectivity, or render the catalyst ineffective, i.e., "poison" it. Charcoal and commercial graphites or carbons made from petroleum residues usually contain trace amounts of sulfur or nitrogen. Carbons made from natural resources may contain these materials as well as metals common to biological systems and may be undesirable for that reason.

While activated charcoals and other carbon-containing materials have been used as catalyst supports, none have heretofore had all of the requisite qualities of porosity and pore size distribution, resistance to attrition and purity for use in a variety of organic chemical reactions. For example, as stated above, although these materials have high surface area, much of the surface area is in the form of inaccessible micropores (i.e., diameter <2 nm).

Nanotube mats, assemblages and aggregates have been previously produced to take advantage of the high carbon purities and increased accessible surface area per gram achieved using extremely thin diameter fibers. These structures are typically composed of a plurality of intertwined or intermeshed fibers. Although the surface area of these nanotubes is less than an aerogel or activated large fiber, the nanotube has a high accessible surface area since the nanotubes are substantially free of micropores.

One of the characteristics of the prior aggregates of nanotubes, assemblages or mats made from nanotubes is low mechanical integrity and high compressibility. Since the fibers are not very stiff these structures are also easily compressed or deformed. As a result the size of the structures cannot be easily controlled or maintained during use. In addition, the nanotubes within the assemblages or aggregates are not held together tightly. Accordingly, the assemblages and aggregates break apart or attrit fairly easily. These prior mats, aggregates or assemblages are either in the form of low porosity dense compressed masses of intertwined fibers and/or are limited to microscopic structures.

It would be desirable to produce a rigid porous carbon structure having high accessible surface area, high porosity, increased rigidity and significantly free from or no micropores. This is particularly true since there are applications for porous carbon structures that require fluid passage and/or high mechanical integrity. The compressibility and/or lack of rigidity of previous structures of nanotubes creates serious limitations or drawbacks for such applications. The mechanical and structural characteristics of the rigid porous carbon structures brought about by this invention make such applications more feasible and/or more efficient.

Carbon Nanotubes

The term nanotubes refers to vermicular carbon deposits having very small diameters including fibrils, whiskers, nanotubes, buckytubes, etc. Such structures provide significant surface area when incorporated into a structure because of their size and shape. Moreover, such fibers can be made with high purity and uniformity.

Carbon nanotubes can be either multi walled (i.e., have more than one graphene layer more or less parallel to the nanotube axis) or single walled (i.e., have only a single graphene layer parallel to the nanotube axis). In the preferred embodiment, the carbon nanotubes are single walled carbon nanotubes having diameters less than 5 nanometers. Single walled carbon nanotubes are often referred to as buckytubes, SWT, SWTs, SWNT, SWNTs, etc.

The most preferred way of making carbon nanotubes is by catalytic growth from hydrocarbons or other gaseous carbon compounds, such as CO, mediated by supported or free floating catalyst particles.

The fibrils, buckytubes, nanotubes and whiskers that are referred to in this application are distinguishable from continuous carbon fibers commercially available as reinforcement materials. In contrast to nanotubes, which have desirably large, but unavoidably finite aspect ratios, continuous carbon fibers have aspect ratios (L/D) of at least $10^4$ and often $10^6$ or more. The diameter of continuous fibers is also far larger than that of nanotubes, being always >1.0 μm and typically 5 to 7 μm.

Continuous carbon fibers are made by the pyrolysis of organic precursor fibers, usually rayon, polyacrylonitrile (PAN) and pitch. Thus, they may include heteroatoms within their structure. The graphitic nature of "as made" continuous carbon fibers varies, but they may be subjected to a subsequent graphitization step. Differences in degree of graphitization, orientation and crystallinity of graphite planes, if they are present, the potential presence of heteroatoms and even the absolute difference in substrate diameter make experience with continuous fibers poor predictors of nanotube chemistry.

Useful single walled carbon nanotubes and process for making them are disclosed, for example, in "Single-shell carbon nanotubes of 1-nm diameter", S Iijima and T Ichihashi Nature, vol. 363, p. 603 (1993) and "Cobalt-catalysed growth of carbon nanotubes with single-atomic-layer walls," D S Bethune, C H Kiang, M S DeVries, G Gorman, R Savoy and R Beyers Nature, vol. 363, p. 605 (1993), both articles of which are hereby incorporated by reference.

Single walled carbon nanotubes are also disclosed in U.S. Pat. No. 6,221,330 to Moy et. al., the contents therein of which are hereby incorporated by reference. Moy disclosed a process for producing hollow, single-walled carbon nanotubes by catalytic decomposition of one or more gaseous carbon compounds by first forming a gas phase mixture carbon feed stock gas comprising one or more gaseous carbon compounds, each having one to six carbon atoms and only H, O, N, S or Cl as hetero atoms, optionally admixed with hydrogen, and a gas phase metal containing compound which is unstable under reaction conditions for said decomposition, and which forms a metal containing catalyst which acts as a decomposition catalyst under reaction conditions; and then conducting said decomposition reaction under decomposition reaction conditions, thereby producing said nanotubes. The invention relates to a gas phase reaction in which a gas phase metal containing compound is introduced into a reaction mixture also containing a gaseous carbon source. The carbon source is typically a $C_1$ through $C_6$ compound having as hetero atoms H, O, N, S or Cl, optionally mixed with hydrogen. Carbon monoxide or carbon monoxide and hydrogen is a preferred carbon feedstock. Increased reaction zone temperatures of approximately 400° C. to 1300° C. and pressures of between about 0 and about 100 p.s.i.g., are believed to cause decomposition of the gas phase metal containing compound to a metal containing catalyst. Decomposition may be to the atomic metal or to a partially decomposed intermediate species. The metal containing catalysts (1) catalyze CO decomposition and (2) catalyze SWNT formation. Thus, the invention also relates to forming SWNT via catalytic decomposition of a carbon compound.

The invention of U.S. Pat. No. 6,221,330 may in some embodiments employ an aerosol technique in which aerosols of metal containing catalysts are introduced into the reaction mixture. An advantage of an aerosol method for producing SWNT is that it will be possible to produce catalyst particles of uniform size and scale such a method for efficient and continuous commercial or industrial production. The previously discussed electric arc discharge and laser deposition methods cannot economically be scaled up for such commercial or industrial production. Examples of metal containing compounds useful in the invention include metal carbonyls, metal acetyl acetonates, and other materials which under decomposition conditions can be introduced as a vapor which decomposes to form an unsupported metal catalyst. Catalytically active metals include Fe, Co, Mn, Ni and Mo. Molybdenum carbonyls and iron carbonyls are the preferred metal containing compounds which can be decomposed under reaction conditions to form vapor phase catalyst. Solid forms of these metal carbonyls may be delivered to a pretreatment zone where they are vaporized, thereby becoming the vapor phase precursor of the catalyst. It was found that two methods may be employed to form SWNT on unsupported catalysts.

The first method is the direct injection of volatile catalyst. Direct injection of volatile catalyst precursors has been found to result in the formation of SWNT using molybdenum hexacarbonyl [Mo(CO)$_6$] and dicobalt octacarbonyl [CO$_2$(CO)$_8$] catalysts. Both materials are solids at room temperature, but sublime at ambient or near-ambient temperatures—the molybdenum compound is thermally stable to at least 150°, the cobalt compound sublimes with decomposition "Organic Syntheses via Metal Carbonyls," Vol. 1, I. Wender and P. Pino, eds., Interscience Publishers, New York, 1968, p. 40).

The second method described in U.S. Pat. No. 6,221,330 uses a vaporizer to introduce the metal containing compound (see FIG. 1 of the '330 patent). In one preferred embodiment of the invention, the vaporizer 10, shown at FIG. 2 of the '330 patent, comprises a quartz thermowell 20 having a seal 24 about 1" from its bottom to form a second compartment. This compartment has two ¼" holes 26 which are open and exposed to the reactant gases. The catalyst is placed into this compartment, and then vaporized at any desired temperature using a vaporizer furnace 32. This furnace is controlled using a first thermocouple 22. A metal containing compound, preferably a metal carbonyl, is vaporized at a temperature below its decomposition point, reactant gases CO or CO/H$_2$ sweep the precursor into the reaction zone 34, which is controlled separately by a reaction zone furnace 38 and second thermocouple 42. Although applicants do not wish to be limited to a particular theory of operability, it is believed that at the reactor temperature, the metal containing compound is decomposed either partially to an intermediate species or completely to metal atoms. These intermediate species and/or metal atoms coalesce to larger aggregate particles which are the actual catalyst. The particle then grows to the correct size to both catalyze the decomposition of CO and promote SWNT growth. In the apparatus of FIG. 1, the catalyst particles and the resultant carbon forms are collected on the quartz wool plug 36. Rate of growth of the particles depends on the concentration of the gas phase metal containing intermediate species. This concentration is determined by the vapor pressure (and therefore the temperature) in the vaporizer. If the concentration is too high, particle growth is too rapid, and structures other than SWNT are grown (e.g., MWNT, amorphous carbon, onions, etc.) All of the contents of U.S. Pat. No. 6,221,330, including the Examples described therein, are hereby incorporated by reference.

U.S. Pat. No. 5,424,054 to Bethune et al., hereby incorporated by reference, describes a process for producing single-walled carbon nanotubes by contacting carbon vapor with cobalt catalyst. The carbon vapor is produced by electric arc heating of solid carbon, which can be amorphous carbon, graphite, activated or decolorizing carbon or mixtures thereof. Other techniques of carbon heating are discussed, for instance laser heating, electron beam heating and RF induction heating.

Smalley (Guo, T., Nikoleev, P., Thess, A., Colbert, D. T., and Smally, R. E., Chemical Physics Letters 243: 1-12 (1995)), hereby incorporated by reference, describes a method of producing single-walled carbon nanotubes wherein graphite rods and a transition metal are simultaneously vaporized by a high-temperature laser.

Smalley (Thess, A., Lee, R., Nikolaev, P., Dai, H., Petit, P., Robert, J., Xu, C., Lee, Y. H., Kim, S. G., Rinzler, A. G., Colbert, D. T., Scuseria, G. E., Tonarek, D., Fischer, J. E., and Smalley, R. E., Science, 273: 483-487 (1996)), hereby incorporated by reference, also describes a process for production of single-walled carbon nanotubes in which a graphite rod containing a small amount of transition metal is laser vaporized in an oven at about 1200° C. Single-wall nanotubes were reported to be produced in yields of more than 70%.

Supported metal catalysts for formation of SWNT are also known. Smalley (Dai., H., Rinzler, A. G., Nikolaev, P., Thess, A., Colbert, D. T., and Smalley, R. E., Chemical Physics Letters 260: 471-475 (1996)), hereby incorporated by reference, describes supported Co, Ni and Mo catalysts for growth of both multiwalled nanotubes and single-walled nanotubes from CO, and a proposed mechanism for their formation.

U.S. Pat. No. 6,761,870 (also WO 00/26138) to Smalley, et. al, hereby incorporated by reference, discloses a process of supplying high pressure (e.g., 30 atmospheres) CO that has been preheated (e.g., to about 1000° C.) and a catalyst precursor gas (e.g., Fe(CO)$_5$) in CO that is kept below the catalyst precursor decomposition temperature to a mixing zone. In this mixing zone, the catalyst precursor is rapidly heated to a temperature that is reported to result in (1) precursor decomposition, (2) formation of active catalyst metal atom clusters of the appropriate size, and (3) favorable growth of SWNTs on the catalyst clusters.

Other methods of producing carbon nanotubes are disclosed in Resasco, et al., "Controlled production of single-wall carbon nanotubes by catalytic decomposition of CO on bimetallic Co—Mo catalysts," Chemical Physics Letters, 317 (2000) 497-503 and U.S. Pat. No. 6,333,016 to Resasco, et. all, both of which are hereby incorporated by reference. The carbon nanotubes are produced therein by contacting a carbon containing gas with metallic catalytic particles.

In addition to the use of particulate catalysts, vertically aligned nanotubes have also been grown on flat substates prepared with a continuous films of at least one catalyst metal as disclosed in Hata, et. al., "Water-assisted highly efficient synthesis of impurity-free single-waited carbon nanotubes", *Science*, 306 (2004) 1362-1364, and Maruyama, et. al., "Direct synthesis of high-quality single-walled carbon nanotubes on silicon and quartz substrates", *Chemical Physics Letters*, 377 (2003) 49-54. Single-walled nanotubes were produced either by water-assisted chemical vapor deposition or ethanol decomposition under vaccum. Materials grown in such a fashion can have a very high area density resembling a forest of parallel nanotubes and nanotube aggregates.

Additional methods for producing single walled carbon nanotubes are disclosed in "Method For Preparing Single Walled Carbon Nanotubes", U.S. Provisional Application No. 60/628,498 filed Nov. 16, 2004, herein incorporated by reference, wherein single wall carbon nanotubes are grown in high selectivity at yields greater than 1 gm of SWTs per Gm of supported catalyst at commercially realistic conditions of pressures between about one and ten atmospheres and temperatures less than 800° C. Advantageously these catalysts are prepared from aqueous solutions of substantially undissociated Fe or Co salts optionally admixed with Mo and feature a planar morphology. The SWTs of this process can be used in the present invention without further purification.

Like most nanotubes, single walled carbon nanotubes usually form as aggregates. These aggregates frequently assume a "rope like" conformation. Individual single walled carbon nanotubes may be accessed by either functionalizing the SWTs or by dispersion in the presence of surfactants or other agents. Alternatively, the structures of this invention may be made from the SWT aggregates themselves. In this case, more open aggregates than ropes are preferred.

Rigid Porous Nanotube Structures

Rigid porous structures are formed by either linking the individual functionalized carbon nanotubes together without the use of a linking molecule, or by gluing carbon nanotube aggregates together with a gluing agent. U.S. Pat. No. 6,099, 965, hereby incorporated by reference, discloses that ceratin functionalized nanotubes become self adhesive after an appropriate thermal treatment. The carbon nanotubes are functionalized, for example, by contacting them with an appropriate reagent (e.g., WO 97/32571, U.S. Pat. No. 6,203,814, all of which are herein incorporated by reference), or by contacting them with an oxidizing agent such as potassium chlorate ($KClO_3$), sulfuric acid ($H_2SO_4$), nitric acid ($HNO_3$), persulfate, hydrogen peroxide ($H_2O_2$), $CO_2$, $O_2$, steam, $N_2O$, NO, $NO_2$, $O_3$, $ClO_2$, etc. (e.g., U.S. Pat. No. 5,965,470, WO 95/07316, PCT/US00/18670 or WO 01/07694, all of which are herein incorporated by reference). The oxidized nanotubes are believed to form ester, anhydride, lactone and ether bonds between themselves.

When a gluing agent is employed, the nanotubes may be unfunctionalized and may be used as individual tubes or in their aggregated form. Preferred gluing agents or binders include cellulose-based polymers, hydroxyl ethyl cellulose, carboxyl methyl cellulose, cellulose, carbohydrates, polyethylene, polystyrene, nylon, polyurethane, polyester, polyamides, poly(dimethylsiloxane), acrylic polymers and phenolic resins.

Rigid porous structures may advantageously be made by extruding a paste like suspension of functionalized nanotubes or a mixture of as made aggregates and gluing agent, (optionally admixed with a liquid vehicle) followed by a calcination step to drive off conveying liquids and either cross link the functionalized nanotubes or to pyrolize the gluing agent.

The "unbonded" precursor nanotubes may be in the form of discrete fibers, aggregates of fibers or both.

OBJECTS OF THE INVENTION

It is therefore an object of this invention to provide rigid porous carbon structures having high accessible surface area.

It is another object of the invention to provide a composition of matter which comprises a three-dimensional rigid porous carbon structure comprising carbon nanotubes.

It is a still further object to provide a rigid porous carbon structure having non-carbon particulate matter or active sites dispersed within the structure on the surface of the nanotubes.

It is yet another object of the invention to provide a composition of matter comprising three-dimensional rigid porous carbon structure having a low bulk density and high porosity to which can be added one or more functional second materials in the nature of active catalysts, electroactive species, etc. so as to form composites having novel industrial properties.

It is a further object of the invention to provide processes for the preparation of and methods of using the rigid porous carbon structures.

It is a still further object of the invention to provide improved catalyst supports, filter media, chromatographic media, electrodes, EMI shielding and other compositions of industrial value based on three-dimensional rigid porous carbon structures.

It is a still further object of the invention to provide improved, substantially pure, rigid carbon catalyst support of high porosity, activity, selectivity, purity and resistance to attrition.

The foregoing and other objects and advantages of the invention will be set forth in or apparent from the following description and drawings.

SUMMARY OF THE INVENTION

The invention relates generally to rigid porous carbon structures and to methods of making same. More specifically, it relates to rigid porous structures having high surface area which are substantially free of micropores. More particularly, the invention relates to increasing the mechanical integrity and/or rigidity of porous structures comprising intertwined carbon nanotubes.

The present invention provides methods for improving the rigidity of the carbon structures by causing the nanotubes to form bonds or become glued with other nanotubes at the fiber intersections. The bonding can be induced by chemical modification of the surface of the nanotubes to promote bonding, by adding "gluing" agents and/or by pyrolyzing the nanotubes to cause fusion or bonding at the interconnect points.

The nanotubes within the porous structure can be in the form individual nanotubes or aggregated bundles or ropes of nanotubes. The former results in a structure having fairly uniform properties with defined pore structure which is essentially free of micropores. The latter results in a structure having two-tiered architecture comprising an overall macrostructure comprising aggregate particles of nanotubes bonded together to form the porous mass and a microstructure of intertwined nanotubes within the individual aggregate particles.

Another aspect of the invention relates to the ability to provide rigid porous particulates of a specified size dimension, for example, porous particulates of a size suitable for use in a fluidized packed bed. The method involves preparing a plurality of carbon nanotubes or aggregates, fusing the nanotubes at their intersections or aggregates to form a large bulk solid mass and sizing the solid mass down into pieces of rigid porous high surface area particulates having a size suitable for the desired use, for example, to a particle size suitable for forming a packed bed.

According to another embodiment of the invention, the structures are used as filter media, as catalyst supports, filters, adsorbents, as electroactive materials for use, e.g. in electrodes in fuel cells and batteries, and as chromatography media. It has been found that the carbon structures are useful in the formation of composites which comprise the structure together with either a particulate solid, an electroactive component or a catalytically active metal or metal-containing compound.

DEFINITIONS

Figure 1:
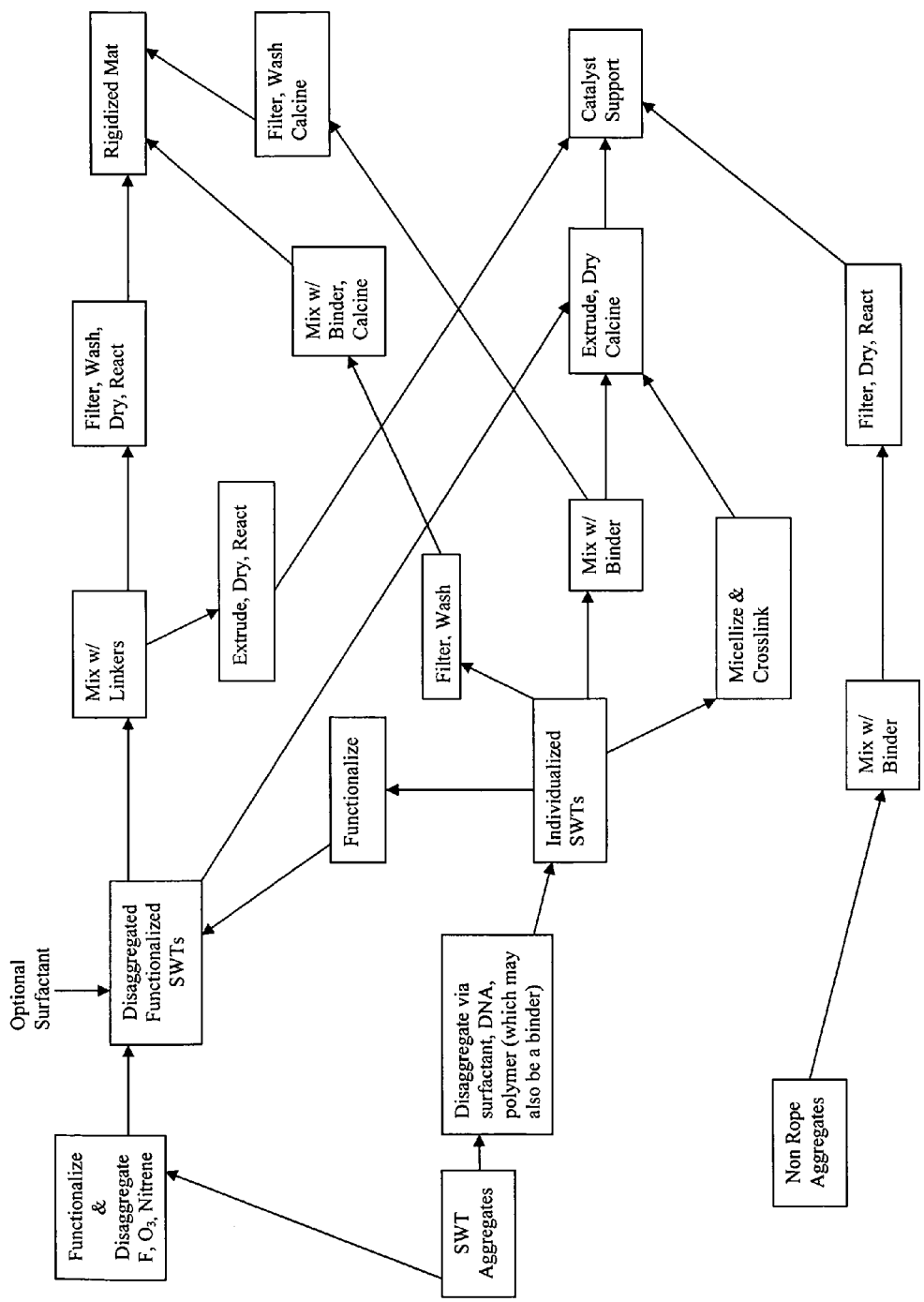
FIG. 1 is a flow chart illustrating the various embodiments of the present invention.

The term "assemblage", "mat" or "aggregate" refers to any configuration of a mass of intertwined individual nanotubes. The term "assemblage" includes open loose structures having uniform properties. The term "mat" refers to a relatively dense felt-like structure. The term "aggregate" refers to a dense, microscopic particulate structure. More specifically, the term "assemblage" refers to structures having relatively or substantially uniform physical properties along at least one dimensional axis and desirably have relatively or substantially uniform physical properties in one or more planes within the assemblage, i.e. they have isotropic physical properties in that plane. The assemblage may comprise uniformly dispersed individual interconnected nanotubes or a mass of connected aggregates of nanotubes. In other embodiments, the entire assemblage is relatively or substantially isotropic with respect to one or more of its physical properties. The physical properties which can be easily measured and by which uniformity or isotropy are determined include resistivity and optical density.

The term "accessible surface area" refers to that surface area not attributed to micropores (i.e., pores having diameters or cross-sections less than 2 nm).

The term "fluid flow rate characteristic" refers to the ability of a fluid or gas to pass through a solid structure. For example, the rate at which a volume of a fluid or gas passes through a three-dimensional structure having a specific cross-sectional area and specific thickness or height differential across the structure (i.e. milliliters per minute per square centimeter per mil thickness).

The term "isotropic" means that all measurements of a physical property within a plane or volume of the structure, independent of the direction of the measurement, are of a constant value. It is understood that measurements of such non-solid compositions must be taken on a representative sample of the structure so that the average value of the void spaces is taken into account.

The terms "nanotube", "nanofiber" and "fibril" are used interchangeably to refer to single walled or multiwalled carbon nanotubes. Each refers to an elongated structure preferably having a cross section (e.g., angular fibers having edges) or a diameter (e.g., rounded) less than 1 micron (for multi-walled nanotubes, aka MWT or MWNT) or less than 5 nm (for single walled nanotubes, aka SWT or SWNT). The term "nanotube" also includes "buckytubes", and fishbone fibrils.

The term "internal structure" refers to the internal structure of an assemblage including the relative orientation of the fibers, the diversity of and overall average of fiber orientations, the proximity of the fibers to one another, the void space or pores created by the interstices and spaces between the fibers and size, shape, number and orientation of the flow channels or paths formed by the connection of the void spaces and/or pores. According to another embodiment, the structure may also include characteristics relating to the size, spacing and orientation of aggregate particles that form the assemblage. The term "relative orientation" refers to the orientation of an individual fiber or aggregate with respect to the others (i.e., aligned versus non-aligned). The "diversity of" and "overall average" of fiber or aggregate orientations refers to the range of fiber orientations within the structure (alignment and orientation with respect to the external surface of the structure).

The term "physical property" means an inherent, measurable property of the porous structure, e.g., surface area, resistivity, fluid flow characteristics, density, porosity, etc.

The term "relatively" means that ninety-five percent of the values of the physical property when measured along an axis of, or within a plane of or within a volume of the structure, as the case may be, will be within plus or minus 20 percent of a mean value.

The term "substantially" means that ninety-five percent of the values of the physical property when measured along an axis of, or within a plane of or within a volume of the structure, as the case may be, will be within plus or minus ten percent of a mean value.

The terms "substantially isotropic" or "relatively isotropic" correspond to the ranges of variability in the values of a physical property set forth above.

DETAILED DESCRIPTION OF THE INVENTION

Functionalization

A useful survey article on functionalization, hereby incorporated by reference, covering both single wall and multiwall tubes is: Hirsch, A. and Vostrowsky, O., "Functionalization of Carbon Nanotubes", Topics in Current Chemistry, (2005) 245:193-237.

Functionalization can be accomplished, for example, by contacting the carbon nanotubes with an appropriate reagent. A particularly useful functionalization method for single wall tubes is cycloaddition. See, for example, Holzinger, M., et al., "[2+1] cycloaddition for cross linking SWCNTs", Carbon 42 (2004) 941-947 and Georgakilas, V., et al., "Organic functionalization of Carbon Nanotubes", JACS Communications, 124 (2002) 760,761, both of which are hereby incorporated by reference.

Where the carbon nanotubes are in the form of aggregates, it is preferred to both break up or de-aggregate the aggregates and functionalize them. Such tasks can be accomplished concurrently by oxidizing the carbon nanotube aggregates. Breaking up of the as-produced aggregates into individual carbon nanotubes is preferable (although not necessary) in order to facilitate the creation of carbon nanotube structures. Hence, when oxidizing agents are used, the terms "functionalized" and "oxidized" may be used interchangably.

In an exemplary embodiment, the carbon nanotubes are oxidized by contacting the nanotubes with ozone under conditions suitable to achieve the desired functionalization (and deaggregation in the case of carbon nanotubes which are in the form of aggregates). Further details are provided in U.S. Provisional Application No. 60/621,132, filed Oct. 22, 2004 entitled "OZONOLYSIS OF CARBON NANOTUBES," herein incorporated by reference.

The subsequent creation of these additional carbon nanotube structures can also be accomplished using any of the following methods or combinations: extrusion, gluing agents, cross linking, pyrolysis, carbonization, etc. (e.g., U.S. Pat. Nos. 6,031,711, 6,099,965, etc., all of which are hereby incorporated by reference).

According to one embodiment of the invention, oxidized nanotubes are used to form the rigid porous assemblage.

Furthermore, the single walled carbon nanotubes may be functionalized by adsorption or other methods as disclosed in U.S. Ser. No. 10/875,435, filed Jun. 23, 2004, herein incorporated by reference.

As-made SWNTs often contains catalyst residues that were responsible for growing such materials have to be removed before assembling into desired structures. The purification procedure includes removal of metal catalyst as well as support materials if any by acid washing. Possible presence of amorphous carbon can be removed by controlled oxidation in $CO_2$, steam or air. Detailed procedure can be seen from Rinzler, et. al., "Large-scale purification of single-wall carbon nanotubes: process, product, and characterization", *Applied Physics,* 67 (1998) 29-37, herein incorporated by reference.

Porous Carbon Structures and Methods of Preparing Same

The invention relates to methods for producing rigid, porous structures from nanotubes. The resulting structures may be used in catalysis, chromatography, filtration systems, electrodes and batteries, etc.

The rigid porous carbon structures according to the invention have high accessible surface area. That is, the structures have a high surface area, but are substantially free of micropores (i.e., pores having a diameter or cross-section less than 2 nm). The invention relates to increasing the mechanical integrity and/or rigidity of porous structures comprising intertwined carbon nanotubes. The structures made according to the invention have higher crush strengths than the conventional nanotube structures. The present invention provides a method of improving the rigidity of the carbon structures by causing the nanotubes to form bonds or become glued with other nanotubes at the fiber intersections. The bonding can be induced by chemical modification of the surface of the nanotubes to promote bonding, by adding "gluing" agents and/or by pyrolyzing the nanotubes to cause fusion or bonding at the interconnect points.

The nanotubes can be in the form of individual nanotubes or aggregate particles in the forms of nanotube bundles or ropes. The former results in a structure having fairly uniform properties. The latter results in a structure having two-tiered architecture comprising an overall macrostructure comprising aggregate particles of nanotube bundles or ropes bonded together and a microstructure of intertwined nanotubes within the individual aggregate particles.

According to one embodiment, individual discrete nanotubes form the structure. In these cases, the distribution of individual fibril strands in the particles are substantially uniform with substantially regular spacing between strands.

These rigid porous materials are superior to currently available high surface area materials for use in fixed-bed carbon-supported catalysts, for example. The ruggedness of the structures, the porosity (both pore volume and pore structure), and the purity of the carbon are significantly improved. Combining these properties with relatively high surface areas provides a unique material with useful characteristics. Additionally, no other carbon support (perhaps no other of any kind) has surface areas as high as 400 $m^2/g$ without having much of the area buried in inaccessible micropores.

One embodiment of the invention relates to a rigid porous carbon structure having an accessible surface area greater than about 800 $m^2/gm$, being substantially free of micropores and having a crush strength greater than about 1 lb, preferably greater than 1000 $m^2/gm$, more preferably greater than 1200 $m^2/gm$. Preferably, the structure comprises intertwined, interconnected carbon nanotubes wherein less than 1% of said surface area is attributed to micropores.

Preferably, the structures have a carbon purity greater than 50 wt %, more preferably greater than 80 wt %, even more preferably greater than 95 wt % and most preferably greater than 99 wt %.

Preferably, the structures measured in the form of ⅛ inch diameter cylindrical extrudates have a crush strength greater than 5 $lb/in^2$, more preferably greater than 10 $lb/in^2$, even more preferably greater than 15 $lb/in^2$ and most preferably greater than 20 $lb/in^2$.

According to another embodiment, the rigid porous carbon structure having an accessible surface area greater than about 800 $m^2/gm$, having a crush strength greater than about 5 $lb/in^2$, and a density greater than 0.3 $g/cm^3$. Preferably, the structure is substantially free of micropores. Preferably the accessible surface area is greater than about 1000 $m^2/gm$, more preferably greater than 1200 $m^2/gm$.

According to one embodiment, the structure comprises nanotubes which are uniformly and evenly distributed throughout said structure. That is, the structure is a rigid and uniform assemblage of nanotubes. The structure comprises substantially uniform pathways and spacings between said nanotubes. The pathways or spacings are uniform in that each has substantially the same cross-section and are substantially evenly spaced.

Another aspect of the invention relates to the ability to provide rigid porous particulates or pellets of a specified size dimension. For example, porous particulates or pellets of a size suitable for use in a fluidized packed bed. The method involves preparing a plurality of carbon nanotubes or aggregates, fusing or gluing the aggregates or nanotubes at their intersections to form a large rigid bulk solid mass and sizing the solid mass down into pieces of rigid porous high surface area particulates having a size suitable for the desired use, for example, to a particle size suitable for forming a packed bed.

The above-described structures are formed by causing the nanotubes to form bonds or become glued with other nanotubes at the fiber intersections. The bonding can be induced by chemical modification of the surface of the nanotubes to promote bonding, by adding "gluing" agents and/or by pyrolyzing the nanotubes to cause fusion or bonding at the interconnect points.

The hard, high porosity structures can be formed from regular nanotubes or nanotube aggregates, either with or without surface modified nanotubes (i.e., surface functionalized nanotubes). In order to increase the stability of the nanotube structures, it is also possible to deposit polymer at the intersections of the structure. This may be achieved by infiltrating the assemblage with a dilute solution of low molecular weight polymer cement (i.e., less than about 1,000 MW) and allowing the solvent to evaporate. Capillary forces will concentrate the polymer at nanotube intersections. It is understood that in order to substantially improve the stiffness and integrity of the structure, only a small fraction of the nanotube intersections need be cemented.

The nanotubes may be uniformly and evenly distributed throughout the structure or in the form of aggregate particles interconnected to form the structure. When the former is desired, the nanotubes are dispersed thoroughly in the medium to form a dispersion of individual nanotubes. When the latter is desired, nanotube aggregates are dispersed in the medium to form a slurry and said aggregate particles are connected together with a gluing agent to form said structure.

The medium used may be selected from the group consisting of water and organic solvents. Preferably, the medium comprises a dispersant selected from the group consisting of alcohols, glycerin, surfactants, polyethylene glycol, polyethylene imines and polypropylene glycol.

The medium should be selected which: (1) allows for fine dispersion of the gluing agent in the aggregates; and (2) also acts as a templating agent to keep the internal structure of the aggregates from collapsing as the mix dries down.

One preferred embodiment employs a combination of polyethylene glycol (PEG) and glycerol dissolved in water or alcohol as the dispersing medium, and a carbonizable material such as low MW phenol-formaldehyde resins or other carbonizable polymers or carbohydrates (starch or sugar).

Single walled carbon nanotubes can additionally be dispersed using surfactants as disclosed by Matarredona, O., H. Rhoads, et al. (2003), in "Dispersion of single-walled carbon nanotubes in aqueous solutions of the anionic surfactant NaDDBS" *Journal of Physical Chemistry B* 107(48): 13357-13367; where anionic, cationic and non-ionic surfactants have been demonstrated to have different dispersion efficiency. Weisman, R. B., S. M. Bachilo, et al. (2004). "Fluorescence spectroscopy of single-walled carbon nanotubes in aqueous suspension." *Applied Physics a-Materials Science & Processing* 78(8): 1111-1116.1,2); also disclosed method of dispersing single walled carbon nanotubes into individual nanotubes using aqueous solution of sodium dodecylsulfate (SDS) by high-shear mixing through vigorous ultrasonic agitation in a cup-horn sonicator. Another method involved using DNA, by Zheng, M., A. Jagota, et al. in "Structure-based carbon nanotube sorting by sequence-dependent DNA assembly." *Science* 302(5650): 1545-1548), to wrap and disperse individual nanotubes; Using micelles to encapsulate single-walled carbon nanotubes is another way to disperse them from bundles or ropes as disclosed in "Photoluminescence from single-walled carbon nanotubes: a comparison between suspended and micelle-encapsulated nanotubes." *Applied Physics a-Materials Science & Processing* 78(8) by Lefebvre, J., J. M. Fraser, et al. (2004) and by Kang, Y. J. and T. A. Taton (2003) in "Micelle-encapsulated carbon nanotubes: A route to nanotube composites." *Journal of the American Chemical Society* 125(19): 5650-5651). Finally, a method of dispersing nanotubes can be carried out by using polymers (Qin, S. H., D. Q. Qin, et al. (2004). "Solubilization and purification of single-wall carbon nanotubes in water by in situ radical polymerization of sodium 4-styrenesulfonate." *Macromolecules* 37(11): 3965-3967; Sabba, Y. and E. L. Thomas (2004). "High-concentration dispersion of single-wall carbon nanotubes." *Macromolecules* 37(13): 4815-4820), etc. All of these references are herein incorporated by reference.

If surface functionalized nanotubes are employed, the nanotubes are oxidized prior to dispersing in the medium and are self-adhering forming the rigid structure by binding at the nanotube intersections. The structure may be subsequently pyrolized to remove oxygen.

According to another embodiment, the nanotubes are dispersed in said suspension with gluing agents and the gluing agents bond said nanotubes to form said rigid structure. Preferably, the gluing agent comprises carbon, even more preferably the gluing agent is selected from a material that, when pyrolized, leaves only carbon. Accordingly, the structure formed with such a gluing may be subsequently pyrolized to convert the gluing agent to carbon.

Preferably, the gluing agents are selected from the group consisting of acrylic polymer, cellulose-based polymers, hydroxyl ethyl cellulose, carboxyl methyl cellulose, cellulose, carbohydrates, polyethylene, polystyrene, nylon, polyurethane, polyester, polyamides, poly(dimethylsiloxane), acrylic polymers and phenolic resins.

According to further embodiments of the invention, the step of separating comprises evaporating the medium from said suspension.

Isotropic slurry dispersions of nanotube aggregates in solvent/dispersant mixtures containing gluing agent can be accomplished using a Waring blender or a kneader without disrupting the aggregates. The nanotube aggregates trap the resin particles and keep them distributed.

These mixtures can be used as is, or can be filtered to remove sufficient solvent to obtain cakes with high nanotube contents (about 5-20% dry weight basis). The cake can be molded, extruded or pelletized. The molded shapes are sufficiently stable so that further drying occurs without collapse of the form. On removing solvent, disperant molecules, along with particles of gluing agent are concentrated and will collect at nanotube crossing points both within the nanotube aggregates, and at the outer edges of the aggregates. As the mixture is further dried down and eventually carbonized, nanotube strands within the aggregates and the aggregates themselves are glued together at contact points. Since the aggregate structures do not collapse, a relatively hard, very porous, low density particle is formed.

Substantially all the oxygen within the resulting rigid structure can be removed by pyrolizing the particles at about 600° C. in flowing gas, for example argon. Pore volumes for the calcined particles are about 0.9-0.6 cc/g, measured by water absorption.

Solid ingredients can also be incorporated within the structure by mixing the additives with the nanotube dispersion prior to formation of the structure. The content of other solids in the dry structure may be made as high as fifty parts solids per part of nanotubes.

According to one embodiment, discs (½ inch in diam) were prepared by isostatic pressing the dried powders of functionalized nanotubes. Densities of the discs could be varied by thermal treatment of the discs. Hard particles with high densities and intermediate porosities can be formed by these methods. Rigid, porous structures made from SWT aggregates with and without any prior chemical treatment can be made using phenolic resins or other organic polymers as gluing agents.

Method For Making Supported Catalyst

One embodiment of the invention relates to a rigid supported catalyst for conducting a fluid phase catalytic chemical reaction, processes for performing a catalytic chemical reaction in fluid phase using the supported catalyst and a process for making the supported catalyst.

The supported catalyst of the invention comprises a support comprising a rigid carbon nanotube structure and a catalytically effective amount of a catalyst supported thereon.

Rigid supported catalysts of the present invention have unique properties. They are exceptionally mesoporous and macroporous and they are pure and they are resistant to attrition, compression and shear and consequently can be separated from a fluid phase reaction medium over a long service life. The increased rigidity of the supports of the present invention enables the structures to be used in fixed bed catalytic reactions. A packing containing the sized rigid structures can be formed and a fluid or gas passed through the packing without significantly altering the shape and porosity of the packing since the rigid structures are hard and resist compression.

Moreover, the uniquely high macroporosity of carbon nanotube structures, the result of their macroscopic morphology, greatly facilitates the diffusion of reactants and products and the flow of heat into and out of the supported catalyst. This unique porosity results from a random entanglement or intertwining of nanotubes that generates an unusually high internal void volume comprising mainly macropores in a dynamic, rather than static state. Sustained separability from fluid phase and lower losses of catalyst as fines also improves process performance and economics. Other advantages of the nanotube structures as catalyst supports include high purity, improved catalyst loading capacity and chemical resistance to acids and bases.

Rigid structures formed from nanotube aggregates are particularly preferred structures for use a catalyst supports. As a catalyst support, carbon nanotube aggregates provide superior chemical and physical properties in porosity, surface area, separability, purity, catalyst loading capacity, chemical resistance to acids and bases, and attrition resistance. These features make them useful in packed bed or fluid bed processes.

Carbon nanotube catalyst supports have a high internal void volume that ameliorates the plugging problem encountered in various processes. Moreover, the preponderance of large pores obviates the problems often encountered in diffusion or mass transfer limited reactions. The high porosities ensure significantly increased catalyst life since more catalyst can be loaded onto the support.

The rigid nanotube catalyst supports of the invention have improved physical strength and resist attrition.

The chemical purity of carbon structures has a positive effect on the selectivity of a supported catalyst since contamination-induced side reactions are minimized. The carbon structures are essentially pure carbon with only small amounts of encapsulated catalytic metal compounds remaining from the process in which the nanotube was formed. The encapsulated fiber-forming metal compound does not act as a catalyst poison or as a selectivity-affecting contaminant.

The combination of properties offered by nanotube structures is unique. No known catalyst supports combine such high porosity, high surface area and high attrition resistance. The combination of properties offered by the nanotube structures is advantageous in any catalyst system amenable to the use of a carbon support. The multiple carbon nanotubes that make up a carbon nanotube structure provide a large number of junction points at which catalyst particles can bond to multiple nanotubes in the nanotube structures. This provides a catalyst support that more tenaciously holds the supported catalyst. Further, nanotube structures permit high catalyst loadings per unit weight of nanotube and this provides a greater reserve capacity of catalyst. Catalyst loadings are generally greater than 0.01 weight percent and preferably greater than 0.1 weight percent based on the total weight of the supported catalyst. Catalyst loadings greater than 50 weight percent of active catalyst based on the total weight of the supported catalyst are easily within the contemplation of the invention, i.e., loadings in excess of 100 weight percent based on the weight of the support of the invention, owing to the porosity of nanotube structures and other factors discussed herein. Desirable active catalysts are the platinum group (ruthenium, osmium, rhodium, iridium, palladium and platinum or a mixture thereof) and, preferably, palladium and platinum or a mixture thereof.

Because of their high purity, carbon fibril aggregates have the properties of high purity graphite and, therefore, exhibit high resistance to attack by acids and bases. This characteristic is advantageous since one path to regenerating catalysts is regeneration with an acid or a base. Regeneration processes can be used which employ strong acids or strong bases. Their high purity also allows them to be used in very corrosive environments.

The supported catalysts are made by supporting a catalytically effective amount of a catalyst on the rigid nanotube structure. The term "on the nanotube structure" embraces, without limitation, on, in and within the structure and on the nanotubes thereof. The aforesaid terms may be used interchangeably. The catalyst can be incorporated onto the nanotube or aggregates before the rigid structure is formed, while the right structure is forming (i.e., add to the dispersing medium) or after the structure is formed.

Methods of preparing heterogeneous supported catalysts of the invention include adsorption, incipient wetness impregnation and precipitation. Supported catalysts may be prepared by either incorporating the catalyst onto the aggregate support or by forming it in situ and the catalyst may be either active before it is placed in the aggregate or activated in situ.

The catalyst, such as a coordination complex of a catalytic transition metal, such as palladium, rhodium or platinum, and a ligand, such as a phosphine, can be adsorbed by slurrying the nanotubes in a solution of the catalyst or catalyst precursor for an appropriate time for the desired loading.

In the preferred embodiment, the supported catalyst is formed by preparing rigid porous structures from single walled carbon nanotubes, then subsequently loading or depositing the metal catalyst onto the carbon nanotube structure. More preferably, the loaded carbon nanotube structure is then ground into powder form as the supported catalyst.

A number of various embodiments of the methods of making the supported catalyst of the present invention are shown in FIG. 1, and one of ordinary skill in the art would readily understand that all variations of such are meant to be included in the scope of the present invention.

Methods of Using Supported Catalysts

Carbon nanotube structures are candidates for use as catalyst supports for catalysts that heretofore utilized carbon as a support material. These catalysts may catalyze substitution—nucleophilic, electrophilic or free radical; addition—nucleophilic, electrophilic, free radical or simultaneous; .beta.-elimination; rearrangement—nucleophilic, electrophilic or free radical; oxidation; or reduction reactions. The foregoing reactions are defined in March, J. Advanced Organic Chemistry (3rd ed., 1985) at pp. 180-182. See also Grant and Hackh's Chemical Dictionary (5th ed. 1987). More particularly, carbon structures of the invention may be used as catalyst supports for catalysts for slurried liquid phase precious metal hydrogenation or dehydrogenation catalysis, Fischer-Tropsch catalysis, ammonia synthesis catalysis, hydrodesulfurization or hydrodenitrogenation catalysis, the catalytic oxidation of methanol to formaldehyde, and nanotube- and/or nanotube aggregate-forming catalysts. Typical heterogeneous catalytic reactions and the catalysts that are candidates for support on rigid porous carbon nanotube structures are set forth in Table IIA and IIB below.

TABLE IIA

| Reaction Hydrogenation | Catalyst |
|---|---|
| Cyclopropane + $H_2$ → $C_3H_8$ | Pt, Pd, Rh, Ru |
| $C_2H_6$ + $H_2$ → $2CH_4$ | |
| $3H_2$ + $N_2$ → $2NH_3$ | Fe |
| $2H_2$ + CO → $CH_3OH$ | $Cu^+$/ZnO |
| Heptane → toluene + $4H_2$ | Pt |
| Acetone + $H_2$ → 2-propanol | Pt, Copper chromite |
| $H_2$ + aldehyde → alcohol | Pt, Pd, Rh, Ru |
| nitrobenzene → aniline | Pd |
| ammonium nitrate → hydroxylamine | Pd |
| alkene → alkane | Pd, Pt, Rh, Ru |
| substituted alkene → substitued alkane | |
| Dehydrogenation | Pt |
| cyclohexanone → phenol + H2 | |
| Fischer-Tropsch | Fe/Mn. Fe/Co, Fe/Ru, K/Fe/Co |
| Ammonia synthesis | K-promoted Ru, Mn, Re, W |
| Hydrodesulfurization | Sulfides of Mo, Co/Mo, W, Ni/W |
| $NO_x$ decompositon/reduction | Cu, Cu/Cr |

TABLE IIB

| Reaction | Catalyst |
|---|---|
| Aromatization | |
| 2a,3,4,4a-tetrahydropyraclone → Pyracene | Pd, Pt, Rb |
| $2HOCH_2CH_2OH$ → 2,3-dihydrodioxin + $H_2$ + $H_2O$ | Pt |
| Polymerization | $Cr^{2+}$/$SiO_2$ |
| $C_2H_4$ → linear polyethylene | |
| Olefin metathesis | $Mo^{4+}$/$Al_2O_3$ |
| $2C_3H_6$ → $C_2H_4$ + $CH_3CH=CHCH_3$ | |

TABLE IIB-continued

| Reaction | Catalyst |
|---|---|
| Oxidation | |
| $CH_3OH + \frac{1}{2}O_2 \rightarrow CH_2O + H_2O$ | $Fe_2O_3 \cdot MoO_3$ |
| $H_2O + CO \rightarrow H_2 + CO_2$ | $Fe_3O_4$, Ni, CuO/ZnO |
| $\frac{1}{2}O_2 + CH_2CH_2 \rightarrow CH_3CHO$ | PdCl and similar salts of noble metals |
| $RCH_2OH \rightarrow RCHO + H_2$ | Pt |
| Glucose → d-glucuronic acid | Pt |
| Oligomerization | Pd |
| dimethylacelylene dicarboxylate → hexamethyl mellitate | |
| Isomerization | Pd |
| 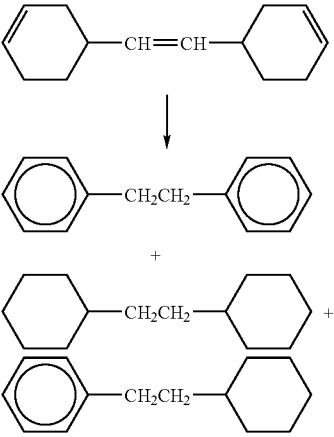 | |
| Carboxylation | Rh |
| $CO + CH_3OH \rightarrow CH_3COOH$ | |
| Decarboxylation | Pd |
| 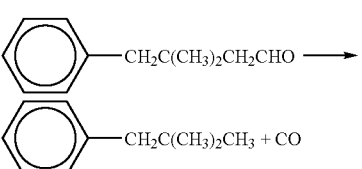 | |
| Hydrosilation | Pt |
| $SiH(CH_3)_3$ + cyclooctadiene-1,3 → 3-trimethylsilyl-cyclooctene | |

The process of performing a heterogeneous catalytic chemical reaction in fluid phase with supported catalysts of the invention comprises contacting a reactant with a supported catalyst in fluid phase under suitable reaction conditions. The process may be a batch process or a continuous process, such as a plug flow process or a gradientless process, e.g., a fluidized bed process. The supported catalysts of the invention are particularly useful in catalytic processes where the reaction environment subjects the supported catalyst to mechanical stresses such as those using liquid phase slurry reactors, trickle bed reactors or fluidized bed reactors. The attrition resistance and high loading capability of the supported catalyst are particularly beneficial in these environments.

In a batch process, the reactant(s) are reacted in the presence of the supported catalyst in a reaction vessel, preferably under agitation, and then the supported catalyst is separated from the reactant(s)/product(s) mixture by suitable means for reuse, such as by a filter or a centrifuge.

In a plug flow process, the reactant(s) pass through a stationary bed of supported catalyst, such that the concentration of product(s) increases as the reactant(s) pass through the catalyst bed. Any supported catalyst that becomes entrained in this flow can be separated by suitable means from the reactant(s)/product(s) stream and recycled into the bed.

In a moving bed or fluidized bed process, the supported catalyst is fluidized or entrained with the flow of reactant(s) in the process. The supported catalyst flows concurrently with the reactant(s)/product(s). At the end of the reaction step, any entrained supported catalyst is separated from the unreacted reactant(s)/product(s) stream, such as by filter, centrifuge or cyclone separator, and recycled to the beginning of the reaction step.

In a fluidized bed process, a bed of the supported catalyst is fluidized but remains within the bounds of a fixed zone as the reactant(s) move through the bed and react to form product(s). In this situation any supported catalyst that becomes entrained in the reactant(s)/product(s) stream may be separated by suitable means and returned to the fluidized bed.

In a further form of continuous process, the supported catalyst moves counter-current to the flow of reactant(s). For example, the reactant may be introduced as a gas into the base of a vertical reaction vessel and removed from the top as product(s). The supported catalyst is introduced at the top of the vessel and cascades turbulently downwardly through the upward gas flow to be withdrawn from the bottom for recycle to the top of the vessel. Any supported catalyst entrained in the gas flow exiting the vessel could be separated and recycled to the top of the vessel for recycle into the reaction vessel.

The supports of the invention can also be used as supports for what would otherwise be homogeneous catalysis, a technique sometimes called supported liquid phase catalysis. Their use as supports permits homogeneous catalytic processes to be run using heterogeneous catalysis techniques. In supported liquid phase catalysis, the reactant(s) and catalyst are molecularly dispersed in the liquid phase that is supported within the structure of the nanotube aggregate.

The high internal volume of nanotube structures, as evidenced by their porosity, permits them to be loaded with a liquid phase catalyst, much like a sponge, and used as a catalyst, but in a solid particle form. Each catalyst-loaded nanotube structure can be viewed as a microreactor in that the interior of the structure is loaded with a continuous liquid phase containing catalyst or a plurality of droplets of catalyst in solution. Consequently, the structure behaves both as a solid particle for material handling purposes and as a homogeneous liquid catalyst for reaction purposes. The usefulness of carbon nanotube structures is aided in this regard by their chemical stability. The advantages in using homogeneous catalyst-loaded nanotube structures are the ease of separating the catalyst from the product stream, ease in carrying out the process, equipment sizing and in avoiding corrosion in the condensed liquid phase.

Carbon nanotube structures are amenable to use as supports in the catalysis of substitutions, additions, β-eliminations, rearrangements, oxidations and reductions. More specifically, they are useful in hydroformylation and carboxylation reactions and the Wacker process.

In carboxylation reactions, a catalyst-loaded carbon nanotube structure is prepared by absorbing a solution of the carboxylation catalyst, such as rhodium chloride and triphenyl phosphine, in a higher boiling point solvent, such as mesitylene or pseudocumene, into dry carbon nanotube structures, such as bird nest carbon nanotube structures.

The carboxylation reaction is carried out by contacting a vapor phase feedstock with the catalyst at appropriate temperatures and pressures. The feedstock mixture may be, e.g., carbon monoxide, methyl acetate, methyl iodide and solvent. The feedstock is absorbed and molecularly dispersed in the catalyst solution and reacts in the liquid phase. The reaction can be carried out in a slurry phase reaction as previously described or in a fixed bed reaction.

The products of reaction, such as acetic anhydride and/or acetic acid and byproducts are removed from the fibril aggregate particles by vaporization or filtration.

In the Wacker Process, a catalyst-loaded carbon nanotube structure is prepared by absorbing a catalyst, such as palladium chloride, copper chloride, potassium chloride or lithium chloride, in a solvent such as water, into dry carbon nanotube structures. The loaded catalyst is then placed into a slurry phase or fixed bed reactor and vapor phase reactants, such as ethylene, oxygen and hydrogen chloride, are passed through the bed at appropriate partial pressures and temperatures. The products, such as acetaldehyde and water can be separated from the catalyst by vaporization or filtration.

EXAMPLES

The invention is further described in the following examples. The examples are illustrative of some of the products and methods of making the same falling within the scope of the present invention. They are, of course, not to be considered in any way limitative of the invention. Numerous changes and modification can be made with respect to the invention.

Example 1

Dissaggregation of SWNTs with a Surfactant

Single-walled nanotubes made from a method described in U.S. Pat. No. 6,827,919 are first treated with 20% HCl to remove any residual metal catalysts responsible for making such material. The treated material is captured on a filter and washed with DI water until the filtrate is neutral pH. The washed nanotubes are then suspended in 1 wt. % aqueous solution of sodium dodecylsulfate (SDS) and subjected to high shear using a probe sonicator for four hours to generate mostly individualized single-walled nanotubes (Sample A).

Example 2

Mixing Disaggregated SWNTs with Aqueous Binder

Disaggregated SWNTs (Sample A of Example 1) are concentrated by centrifugation to a level of 2 wt %. Poly(acrylic acid-co-maleic acid), 50% solution in water is added to obtain a 1:1 ratio of polymeric binder to nanotubes. The resulting paste like material is blended in a Retsch mortar mill to a uniform consistency (Sample B). The uniform nanotube paste, Sample B, is extruded through a die with a circular aperture forming a strand. The stand is cut to shorter lengths and dried at 200° C. in air overnight after which it is calcined at 600° C. in an argon atmosphere for 6 hours to produce rigid, porous catalyst support particles.

Example 3

Dissaggregation of SWNTs with a Polymeric Binder

Single-walled nanotubes made from a method described in U.S. Pat. No. 6,827,919 are first treated with 20% HCl to remove any residual metal catalysts responsible for making such material. The treated material is captured on a filter and washed with DI water until the filtrate is neutral pH. The washed nanotubes are then suspended Di water to a level of 0.05 wt % in 1 wt. % aqueous gum Arabic and then subjected to high shear using a probe sonicator for four hours to generate mostly individualized single-walled nanotubes (Sample C).

Example 4

Extrudate from SWNTs with Polymeric Dispersant

Disaggregated SWNTs in an aqueous solution of gum Arabic (Sample C of Example 3) are concentrated by centrifugation followed by filtration to a level of ~2 wt % nanotubes. The resulting paste like material in the filter cake is blended in a Retsch mortar mill to a uniform consistency (Sample D) after which it is extruded through a die with a circular aperture forming a strand. The stand is cut to shorter lengths and dried at 200° C. in air overnight after which it is calcined at 600° C. in an argon atmosphere for 6 hours to produce rigid catalyst support particles.

Example 5

Rigid Mat from SWNTs with Surfactant Dispersant

Disaggregated SWNTs (Sample A of Example 1) are vacuum filtered onto a 0.45 micron PVDF membrane filter. When almost dry, the filter cake is washed by gently adding DI water so as not to disturb the structure of the filter cake. While still slightly wet, the membrane is peeled from the filter cake. The thin filter cake is sandwiched between two porous, PTFE membranes, placed between two porous, sintered ceramic plates to keep the filter cake flat and dried at 200° C. in air overnight. The PTFE membranes are removed and the dried nanotube mat is again sandwiched between the two porous, sintered ceramic plates and the stack is calcined at 600° C. in an argon atmosphere for 6 hours to produce a rigid, SWNT mat.

Example 6

Comparative

Preparation of a Low-Density Nonrigid Porous Nanotube Plug

Supercritical fluid removal from a well dispersed carbon nanotube paste is used to prepare low density shapes. 50 cc of a 0.5% dispersion in n-pentane is charged to a pressure vessel of slightly larger capacity which is equipped with a needle valve to enable slow release of pressure. After the vessel is heated above the critical temperature of pentane (Tc=196.6° C.), the needle valve is cracked open slightly to bleed the supercritical pentane over a period of about an hour.

The resultant solid plug of nanotubes, which has the shape of the vessel interior, has a density of 0.005 g/cc, corresponding to a pore volume fraction of 0.998. The resistivity is isotropic and about 20 ohm/cm. The resulting structure had poor mechanical properties including low strength and high compressibility.

Example 7

Formation of Rigid Porous Structure from Micelle Encapsulated Nanotubes

Encapsulation of SWNTs within amphiphilic block copolymer shells can be carried out by cross-linking block co-polymer based micelles. Amphiphilic poly(styrene)-block-poly(acrylic acid) copolymer is first dissolved in dimethylformamide, a solvent in which both blocks are well solvated and micelles can not form. SWNTs made using the procedure from "Method For Preparing Single Walled Carbon Nanotubes", U.S. Provisional Application No. 60/628,498 filed Nov. 16, 2004, herein incorporated by reference. are then suspended in this solution by ultrasonication using a probe sonicator. Micellization of the amphiphile is induced by gradually adding $H_2O$ to the nanotube suspension. As has been observed for other neutral surfactants such as Triton-X 100, 11 PS-b-PAA copolymers are effective at stabilizing SWNT dispersions in aqueous solution and water mixtures. However, nanotubes that are simply codispersed with PS-b-PAA can not be isolated and resuspended in other media. The PAA blocks of the micellar shells can be permanently crosslinked by addition of a water-soluble diamine linker and a carbodiimide activator. The extent of shell cross-linking could be varied by adjusting the amount of diamine linker added and monitored by IR spectroscopy. After the cross-linking, excess reagents are removed by dialysis of the suspension against deionized water. Micelle-encapsulated SWNTs (e-SWNTs) are then dried and form rigid porous structure via controlled calcinations (300-500C) to remove majority of binding agent.

Example 7A

Mixed SWNT and Oxidized MWNT

MWNT such as CC type are oxidized by treatment with 63% nitric acid for 4 hours at reflux. The nitric acid treated material is captured on a filter and washed with DI water until the filtrate is neutral pH. The oxidized MWNT are resuspended in DI water to a level of 0.05% and subjected to high shear using a probe sonicator for 1 hour to generate mostly individualized Multi-walled nanotubes (Sample D).

In a separate vessel, a dispersion of SWNT as described for Sample A of Example 1 is prepared. To this dispersion of SWNT is added the oxidized MWNT, Sample D, and mixed with a Waring blender. The resulting slurry is further subjected to high shear using a probe sonicator for 1 hour. The mixture is then concentrated by centrifugation followed by filtration to ~5% total solids. The resulting paste like material in the filter cake is blended in a Retsch mortar mill to a uniform consistency after which it is extruded through a die with a circular aperture forming a strand. The stand is cut to shorter lengths and dried at 200° C. in air overnight after which it is calcined at 600° C. in an argon atmosphere for 6 hours to produce rigid catalyst support particles.

Example 8

Functionalization Nanotubes with Ozone

Ozone is generated via an air purifier made by Del Industry, San Luis Obispo, Calif., which can generate ozone at a rate of 250 mg/hr. A mixture of ozone and air (0.29% ozone) at a flow rate of 1200 mL/min is then passed though a 1-inch (OD) reactor tube packed with dry as-made single-walled nanotubes made with the method described in U.S. Pat. No. 6,827,919. The weight of nanotubes before and after ozone treatment are recorded. The reaction is allowed to proceed for a period of 3 to 45 hours at room temperature. The relative amount of acidic groups on the treated sample are measured through titration. 0.25 gram of the sample is placed into a flask containing 300 mL D.I. water and the slurry is titrated with 0.1N NaOH. The consumption of NaOH is translated into the quantity of total surface acidic groups as meq/g. A titer of 2 meq/g is obtained.

Example 9

Functionalization with Nitrene 5 grams of SWNTs made by the method described in U.S. Pat. No. 6,827,919 are suspended in 100 mL DMF, together with excess aldehyde and modified glycine. The heterogeneous reaction mixture was heated at 130° C. for 5 days. After reaction, the product is filtered and thoroughly washed with toluene. The resultant material is then characterized with NMR and UV-vis to confirm the generation of surface pyrene functionality.

Example 10

Making SWT Extrudate Supported Catalyst

Single-wall nantoube extrudate made from Example (4) are further oxidized via ozonolysis using a procedure described in a U.S. Provisional Application No. 60/621,132, filed Oct. 22, 2004, in order to create anchoring sites for catalyst precursors. In a 250-cc round bottom flask, an 8-h reflux with $K_2PtCl_4$ in dilute ethylene glycol (3:2 by volume ethylene glycol:DI $H_2O$) at 120-130° C. deposits Pt particles onto the SWNT extrudates. Approximately 1.5 mg of $K_2PtCl_4$ and 20 mL of diluted ethylene glycol are added per 10 mg of SWNT extrudates. The final product (Pt-loaded SWNT extrudates) is cooled, filtered, washed with DI water made slightly acidic with a few drops of HCl (a nonoxidizing acid to destabilize the suspension), and then dried at 60° C. Typical metal loading of the final material is 10 wt % Pt. TEM investigation reveals average Pt particle size of 1-2 nm.

Example 11

Making SWT Extrudate Supported Catalyst 1 g of single-walled nanotube extrudates made in Example (4) are first lightly oxidized by 30% nitric acid at 60° C. for a period of 30 minutes in a round bottom flask followed by thorough washing with deionized water. 30 ml 0.25 wt % $PdCl_2$/HCl solution is loaded in a flask with 20 ml water. The pH of the solution at this point is around 4. Then the oxidized single-walled nanotube extrudates are added to the solution. The slurry is stirred at room temperature for 24 hours followed by filtration in the end. After thoroughly washed with DI water, the cake is dried at 110° C. in vacuum over night. CO chemisorption at room temperature indicates that after, reduction at 300° C. for 2 hours, the Pd dispersion of is 30% with loading of approximately 3 wt %.

Example 12

Hydrogenation of Nitrobenzene on a Carbon Nanotube Extrudate Supported Catalyst The hydrogenation of nitrobenzene is carried out at ambient temperature and pressure in a three-neck round bottom flask with overhead stirrer. 0.05 g of catalyst made according to the procedure in the previous Example is placed in the flask with 50 ml isopropanol. Before adding the reactant, the catalyst is in-situ reduced by bubbling hydrogen for two hours under agitation. 50 ml of 10 vol % nitrobenzene in 2-propanol is added to the slurry. Small amount of sample is taken out every 30 min (every 15 min in the first 45 min) by using a syringe equipped with a filter until nitrobenzene consumed completely, which is determined by a GC equipped with FID and 3% OV-17/Chromosorb W-HP column. The conversion of nitrobenzene is found to reach 100% after 60 minutes

We claim:

1. A method of preparing a rigid porous carbon structure having a surface area greater than at least 800 $m^2/gm$, comprising the steps of:
   (a) dispersing a plurality of single walled carbon nanotubes in the form of aggregate particles in a medium to form a suspension; said medium including a dispersant selected from the group consisting of alcohols, DNA, glycerin, surfactants, polyethylene glycol, polyethylene imines and polypropylene glycol,
   (b) sonicating said suspension to disaggregate said aggregate particles into a plurality of individual single walled carbon nanotubes,
   (c) mixing said suspension with a gluing agent,
   (d) extruding said suspension and calcining to form said rigid structure of intertwined single walled carbon nanotubes bonded at the nanotubes intersections within the structure.

2. The method as recited in claim 1, wherein said nanotubes are uniformly and evenly distributed throughout said structure.

3. The method as recited in claim 1 wherein said medium is selected from the group consisting of water and organic solvents.

4. The method as recited in claim 1, wherein said gluing agents are selected from the group consisting of acrylic polymer, cellulose-based polymers, hydroxyl ethyl cellulose, carboxyl methyl cellulose, cellulose, carbohydrates, polyethylene, polystyrene, nylon, polyurethane, polyester, polyamides, poly(dimethylsiloxane), and phenolic resins.

* * * * *